United States Patent [19]
Hemenway et al.

[11] Patent Number: 5,638,505
[45] Date of Patent: Jun. 10, 1997

[54] APPARATUS AND METHODS FOR MOVING/COPYING OBJECTS USING DESTINATION AND/OR SOURCE BINS

[75] Inventors: Kathleen Hemenway, Menlo Park; Mitchell I. Jerome, Sunnyvale; Kevin Mullet, Mountain View, all of Calif.

[73] Assignee: Sun Microsystems, Inc., Mountain View, Calif.

[21] Appl. No.: 746,328

[22] Filed: Aug. 16, 1991

[51] Int. Cl.$^6$ ............................................. G06F 3/100
[52] U.S. Cl. ........................................ 395/348; 395/340
[58] Field of Search ................................ 395/157, 161, 395/155, 159

[56] References Cited

U.S. PATENT DOCUMENTS

| | | | |
|---|---|---|---|
| 4,889,136 | 12/1989 | Beard et al. | 395/155 |
| 5,040,131 | 8/1991 | Torres | 395/157 X |
| 5,113,517 | 5/1992 | Beard et al. | 395/162 X |
| 5,140,677 | 8/1992 | Fleming et al. | 395/157 X |
| 5,140,678 | 8/1992 | Torres | 395/157 X |

FOREIGN PATENT DOCUMENTS 91480118  7/1991  France.

OTHER PUBLICATIONS

Microsoft Windows User's Guide (Trademark of Microsoft Corporation 1985–1990) pp. 21, 92–95, 129–131, 603 & 608.
MacIntosh System Software User's Guide (Trademark of Apple Computer Inc. 1988) pp. 111–112.
Microsoft Windows User's Guide (Trademark of Microsoft Corporation), 1990, attached sheets 1–3.
IBM Systems Application Architecture, Common User Access —Advanced Interface Design Guide, IBM, Jun. 1989, pp. 111–115.
Kobara, S. Visual Design with OSF/Motif, Addison Wesley, 1991, Figure C–4.
Myers, *A Taxonomy of Window Manager User Interfaces*, IEEE Computer Graphics and Applications vol. 8, No. 5, Sep. 1988, pp. 65–84.
IBM Technical Disclosure Bulletin vol. 33, No. 6B, Nov. 90, New York, pp. 256–257, article entitle 'Window mini–icon'.

*Primary Examiner*—Heather R. Herndon
*Assistant Examiner*—Cliff N. Vo
*Attorney, Agent, or Firm*—Blakely, Sokoloff, Taylor & Zafman, LLP

[57] ABSTRACT

Three modes of moving and copying an object within an application or between applications are provided to a computer system having a graphical user interface. The three modes of moving/copying are: a) unmodified move and unmodified or modified copy from a data pane of a first display window to a "destination bin" of a second display window, b) unmodified copy from a "source bin" of a first display window to a data pane of a second display window, and 3) unmodified copy from a "source bin" of a first display window to a "destination bin" of a second display window. The three modes of moving/copying are performed with a CPU coupled to a display device, a cursor control device and a keyboard. Visual feedback is provided to the user throughout the different modes of moving and copying.

39 Claims, 15 Drawing Sheets

APPARATUS AND METHODS FOR MOVING/COPYING OBJECTS USING DESTINATION AND/OR SOURCE BINS

BACKGROUND OF THE INVENTION

1. Field of the Invention

The present invention relates to apparatus and methods for displaying and manipulating information on a computer system, and more particularly, the present invention relates to a computer controlled display system and methods employed on the display system for a user to move or copy an object from one display window to another, either within or between applications.

2. Art Background

Today, many computer systems utilize one of a variety of direct manipulation graphical user interfaces in which many previously coded programming commands are replaced by graphic images, or icons, on a computer display. These graphic images, or icons, symbolically represent a variety of objects or operations the computer system will execute if the graphic images, or icons, are chosen. A user interacts with the computer by choosing and manipulating these graphic images, or icons.

Additionally, many graphical user interfaces utilize multiple windows displayed on the computer display for the applications to convey information to a user. The information is presented in a combination of text and graphics in these windows. Each window may take the form of a variety of objects such as a file folder, loose-leaf binder, or simple rectangle, and the windows may overlap one another with the "top" window fully visible and constituting the current "work file". The user may delete information from a window, move data from one window to another, and generally operate on the window as if an actual file in an office is being used. Thus, the user is permitted to operate on and manipulate the window contents, and the window itself, as if the image constituted an actual object.

For further description of graphical user interfaces, see, D. Robson, "Object Oriented Software System", BYTE, August 1981, p. 74, Vol. 6, No. 8; and L. Tesler, "The Small Talk Environment", BYTE, August 1981, p. 90, Vol. 6, No. 8. See also, U.S. Pat. No. Re. 32,632, reissued Mar. 29, 1988, and assigned to Apple Computer, Inc.; and U.S. patent application Ser. No. 07/323,774, filed Mar. 15, 1989 and its corresponding Division and Continuation application Ser. Nos. 07/458,596 and 07/619,665, filed Dec. 26, 1989 and Nov. 28, 1990 respectively, and assigned to the assignee of the subject application, SUN Microsystems, Inc.

For further description of specific implementations of graphical user interfaces, for example, OPEN WINDOWS, by SUN Microsystems, Inc., or others by manufacturers such as International Business Machines, and Apple Computer, Inc., the reader is directed to technical literature provided by these companies.

Although a variety of graphical user interfaces have been developed by the computer industry, the various methods by which a user interfaces with the computer display system vary significantly between machines. However, most object oriented graphical user interfaces support a "drag and drop" operation for moving and copying objects. For example, a user may reorganize his file directory by moving a document into a folder, delete a file by moving a document into a wastebasket, or print a file by copying a document onto a printer. In each case, the user selects and moves or copies the document by pressing the select switch of a "mouse" while the cursor is on the document icon, "drags" the document icon to one of the corresponding folder, wastebasket or printer icons by holding down the select switch while repositioning the cursor, and then "drops" the document icon onto one of the corresponding icons by releasing the select switch.

In the print example illustrated above, copying (as opposed to moving) is "obvious" in view of the context, since most likely the user would want to retain the soft copy after making a hard copy. For other situations where copying versus moving are not as "obvious", many graphical user interfaces also support explicit copying in their "drag and drop" operation. For example, a user may wish to copy a block of data from one file to another, instead of moving the block of data. In this case, after identifying the block of data, the user selects the block of data for "dragging" by pressing the select switch as before. In addition, the user indicates he wants to copy instead of move by pressing a copy key on the keyboard. Then, the block of data is "dragged and dropped" onto the destination file by holding down and releasing the select switch as before. However, because the copy key was pressed earlier, after the block of data is inserted into the destination file, it is not deleted from the source file.

The traditional "drag and drop" operation for moving and copying objects has at least three limitations:

1) it may not be apparent to the user that the operation can be applied to a display window where there is no "obvious" place to drop;
2) it may not be apparent to the user that the operation can be applied to a display window where there is no "obvious" object to drag; and
3) it is often unclear whether the data being dropped should replace or be inserted into the current data.

It has been found that the functionality of the graphical interface of a computer system significantly impacts the efficiency and ease of use of the particular computer system. As will be described, the present invention provides an improved apparatus and method for a user to move or copy objects from one application to another. The present invention overcomes the disadvantages of the prior art, and provides significant improvements to the traditional "drag and drop" operation of direct manipulation graphical user interfaces.

SUMMARY OF THE INVENTION

An apparatus and method for a user to move or copy an object within an application or between applications is disclosed which has application for use in computer controlled display systems, and in particular, display systems having direct manipulation graphical user interfaces. A central processing unit (CPU) is provided for executing at least one application on behalf of a user and is coupled to a display for displaying graphics and other data for the applications. The CPU is further coupled to a cursor control device and a keyboard which permits the user to selectively position a cursor at a desired location on the display and signaling the CPU in accordance to the teachings of the present invention.

First and second display windows are generated for at least one application and displayed on the display by the CPU. The first display window contains an object icon representing an object, and the second display window includes a destination bin image. The user selects the object for a move or copy operation by positioning the cursor over the object icon and pressing the select switch of the cursor control device. The user may further indicate the selection of the copy operation by pressing the copy key on the keyboard, otherwise the applications select one of the two operations by context. The user moves/copies the object by holding down the select switch while repositioning the cursor from the object's selection position in the first display window to the destination bin image on the second display window. The user completes the move/copy by releasing the select switch once the cursor has been repositioned over the destination bin image. In response, the CPU moves/copies the object within the application or between the applications.

Visual feedback is repeatedly generated and displayed on the display for the user by the CPU. While the object is selected and the cursor is being repositioned, the visual appearance of the cursor is altered to denote either a move or a copy operation is in progress. The selected object icon is attached to the modified cursor to give the user the perception that the selected object is being relocated as the cursor is being repositioned. Additionally, a "Drop allowed" or a "Drop not allowed" symbol is superimposed on the cursor to inform the user whether the second display window's application is an eligible receiver of the object, once the cursor has been repositioned over the destination bin image. As soon as the select switch is released, the destination bin image is further modified to inform the user that the actual move or copy from the first display window's application to the second display window's application is in progress. At the end of the move, the first display window's contents are regenerated and redisplayed without the moved object by the CPU. At the end of either a move or a copy, the second display window is regenerated and redisplayed with the moved or copied object replacing the existing data by the CPU. The destination bin image in the second display window is again modified to denote the completion of the actual move/copy and whether the object can be further moved or copied by "taking it out of the destination bin" of the second display window or not.

Alternately, the first display window includes a source bin image containing a content image representing an object, and the second display window does not include a destination bin image. Similarly, the user selects the object for copying by pressing the select switch, copies the object by holding down the select switch while repositioning the cursor, and identifies the copy destination by releasing the select switch after repositioning the cursor to the copy destination. Except in this case, the user positions the cursor over the source bin image when he presses the select switch, and positions the cursor at some point within the second display window when he releases the select switch. Furthermore, the user does not have to press the copy key to select the copy operation, the copy operation is always assumed.

Similar visual feedback is repeatedly generated and displayed on the display for the user by the CPU. Except in this case, at the end of the copy, the second display window is regenerated and redisplayed with the copied object either replacing or inserted into the existing data, at the election of the second display window's application, by the CPU.

As a further alternative, the first display window includes a source bin image containing a content image representing an object, and the second display window includes a destination bin image. Similarly, the user selects the object for copying by pressing the select switch, copies the object by holding down the select switch while repositioning the cursor, and identifies the copy destination by releasing the select switch after repositioning the cursor to the copy destination. Except in this case, the user positions the cursor over the source bin image in the first display window when he presses the select switch, and positions the cursor over the destination bin icon in the second display window when he releases the select switch. The user also does not have to press the copy key to select the copy operation, the copy operation is always assumed.

Similar visual feedback is repeatedly generated and displayed on the display for the user by the CPU. Except in this case, during the actual copy of the object from the first display window's application to the second display window's application, the destination bin image on the second display window is modified to denote the actual copy is in progress. Furthermore, at the completion of the actual copy, the second display window is regenerated and redisplayed with the copied object replacing the existing data by the CPU, and the destination bin image on the second display window is further modified to denote the completion of the actual copy and whether the object may be further copied from the second display window by "taking it out of the destination bin" or not.

BRIEF DESCRIPTION OF THE DRAWINGS

The features and advantages of the present invention will be apparent from the following detailed description of the preferred embodiment of the invention with references to the drawings in which.

NOTATIONS AND NOMENCLATURE

Figure 1:
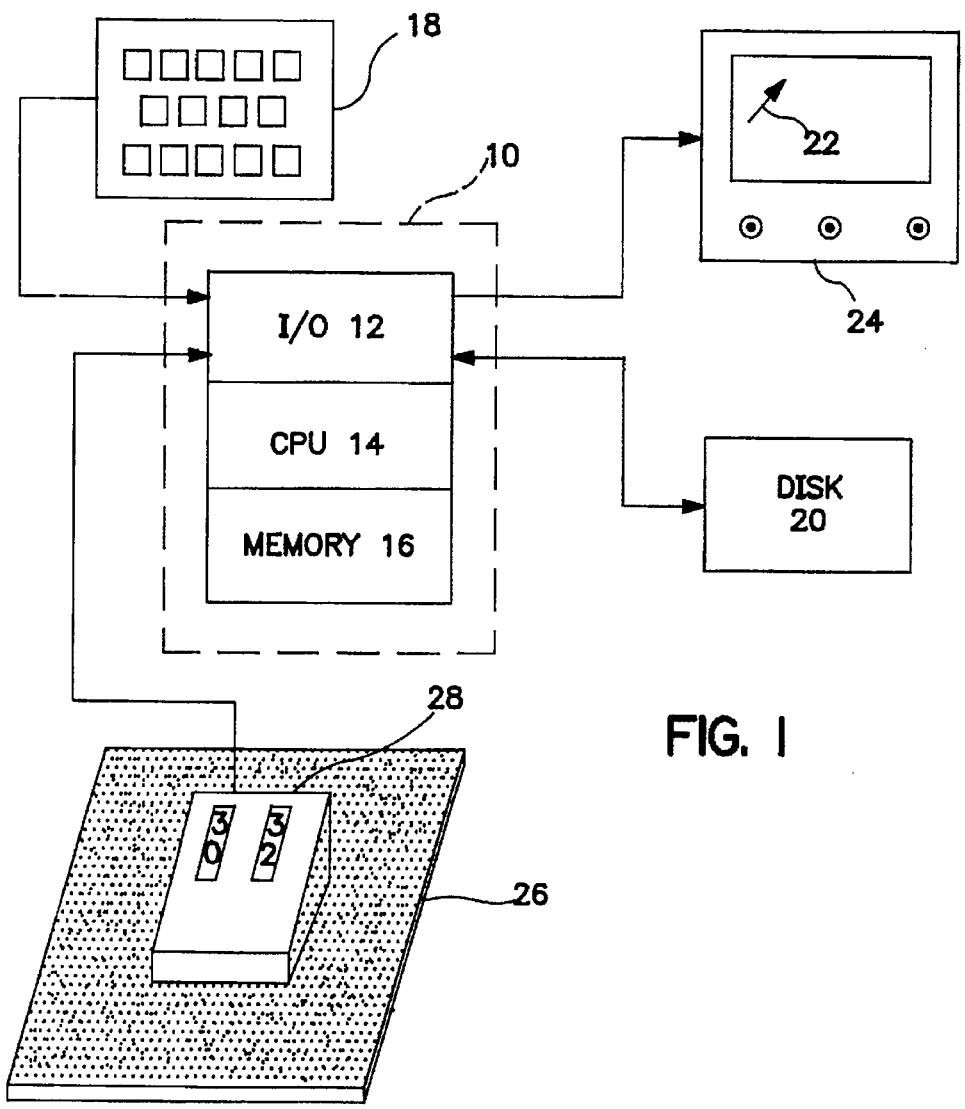
FIG. 1 illustrates a computer incorporating the teachings of the present invention.

The detailed description which follows is presented largely in terms of procedures executed on a central processing unit (CPU). These procedural descriptions and representations are the means used by those skilled in the art of computer systems to most effectively convey the substance of their work to others skilled in the art.

A procedure is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operation described herein which form part of the present invention; the operations are machine operations. Useful machines for performing the operations of the present invention include general purpose digital computers or other similar devices. In all cases, a distinction should be maintained between the method involved in operating a computer and the method of computation itself. The present invention relates to method steps for operating a computer in processing electrical or other physical signals to generate other desired physical signals.

The present invention also relates to apparatus for performing these operations. This apparatus may be specially constructed for the required purposes or it may comprise a general purpose computer as selectively activated or re-configured by a computer program stored in the computer. The procedures presented herein are not entirely related to any particular computer or other apparatus. In particular, various general purpose machines may be used with procedures written in accordance with the teaching herein, or it may prove more convenient to construct more specialized apparatus to perform the required method steps. The required structure for a variety of these machines will appear from the description given below.

DETAILED DESCRIPTION OF THE INVENTION

An apparatus and methods for either moving or copying an object within an application or between applications is disclosed which has application to computer controlled display systems, in particular, display systems having direct manipulation graphical user interfaces. In the following description for purposes of explanation, specific applications, numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

The apparatus and methods for either moving or copying an object within an application or between applications of the present invention, in its presently preferred embodiment, comprises three related modes of operation: 1) from a data pane of a display window to a "destination bin" of a display window, 2) from a "source bin" of a display window to a data pane of a display window, and 3) from a "source bin" of a display window to a "destination bin" of a display window. An exemplary computer system for generating graphic images and responding to a user's input in accordance to the teachings of the present invention will first be described. The three related modes of operation will be described individually using three exemplary applications: a File Manager, a Text Editor and a Print Tool. Then, the overall operational flow of the present invention encompassing all three modes of operation and the visual feedback to the user provided by the present invention will be described.

Referring now to FIG. 1, an exemplary computer based system for generating graphic images and responding to a users input in accordance with the teachings of the present invention is illustrated. Shown is a computer 10 comprised of three major components. The first of these is an input/output (I/O) circuit 12 which is used to communicate information in appropriately structured form to and from other portions of the computer 10. In addition, the computer 10 includes a central processing unit (CPU) 14 coupled to the I/O circuit 12 and a memory 16. These elements are those typically found in most general purpose computers, and, in fact, the computer 10 is intended to be representative of a broad category of computer systems.

A magnetic disk 20 is shown coupled to the I/O circuit 12 to provide additional storage capability for the computer 10. It will be appreciated that additional devices may be coupled to the computer 10 for storing data such as magnetic tape drives, as well as networks which are in turn coupled to other computer systems. As is well known, the disk 20 may store other computer programs, characters, routines, etc., which may be accessed and executed by the CPU 14.

A raster display monitor 24 is shown coupled to the I/O circuit 12 and is used to display images generated by the CPU 14 in accordance to the teachings of the present invention. Any well known variety of raster (or pix-mapped) display may be utilized as display 24. A keyboard 18 is shown coupled to the I/O circuit 12 and is used to input data and commands into the computer 10, as is well known. In particular, the keyboard 18 allows a user to provide the CPU 14 with a copy signal by pressing a "copy" key. A cursor control device 28 is also shown coupled to the computer 10 through the I/O circuit 12. The cursor control device 28 (commonly known as a "mouse") permits a user to select various command modes, modify graphic data, and input other data. More particularly, the cursor control device 28 permits a user to selectively position a cursor 22 at any desired location on the display 24 by movement of the cursor control device 28 over a surface 26. The cursor control device 28 also permits the user to provide the CPU 14 with a select/unselect signal using the switch 30. Any well known variety of cursor control device, such as optical mice, mechanical mice, track balls and joy sticks, may be utilized for the cursor control device 28.

Figure 2:
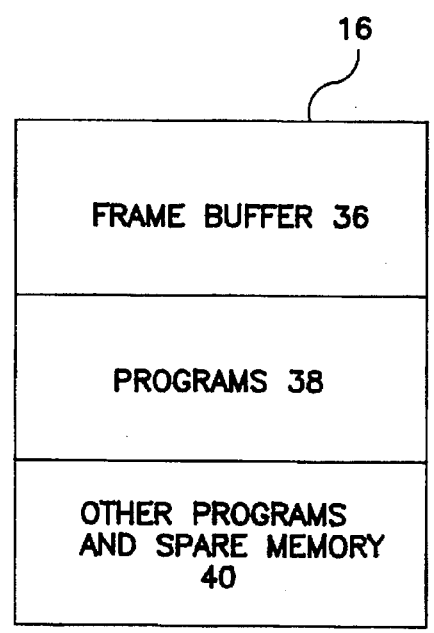
FIG. 2 shows one arrangement of program storage for the system of FIG. 1.

Referring now to FIG. 2, one arrangement of major programs contained within the memory 16 illustrated in FIG. 1 is shown. In particular, there is shown a frame buffer 36, which serves as a pixel map of the display 24. The frame buffer 36 represents the video memory for the display 24, wherein, each storage location in the frame buffer 36 corresponds to a pixel on the display 24. Thus, the frame buffer comprises a two dimensional array of points having known coordinates corresponding to the pixels on the raster display 24. The memory 16 also comprises a variety of programs implemented per the teaching of the present invention 38, as disclosed in this specification, for execution by the CPU 10. Additionally, the memory 16 further comprises other programs for controlling or performing other well known functions and operation on computer systems.

Figure 3A:
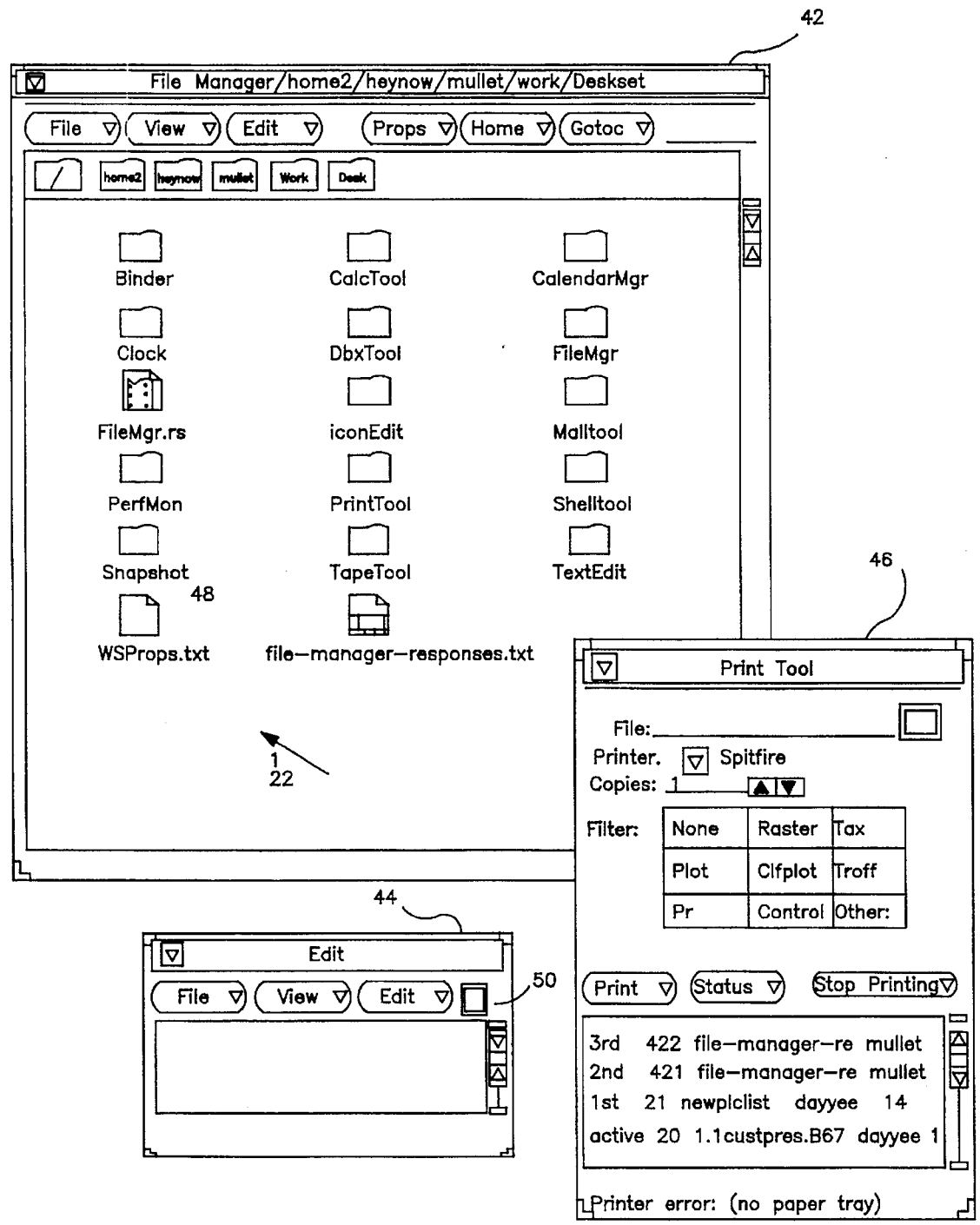
FIGS. 3a–3f graphically illustrate a first related mode of operation of the present invention in its preferred form.

Referring now to FIGS. 3a–3f, a first related mode of operation of the present invention in its preferred form is illustrated. The first related mode of operation will be described by an exemplary modified copying of an object "WSProps.txt" from the File Manager application into the Text Editor application. As shown in FIG. 3a, a File Manager and Text Editor display windows 42 and 44 are generated and displayed on the display 24 for the File Manager and the Text Editor applications by the CPU. Also shown is a Print Tool display window 46 generated and displayed on the display 24 by the CPU. The File Manager display window 42 contains an object icon 48 for the object "WSProps.txt" and the Text Editor display window 44 includes a destination bin image 50. The destination bin image, in its presently preferred form, has the visual appearance of a rectangle box with a sunken look. (See also FIG.

6, ref. 98 for detail.) The Print Tool display window also includes a destination bin image 52. Also shown in the File Manager display window 42 is a number of other object icons representing other objects.

Continuing referring to FIG. 3a, the user selects the object "WSProps.txt" for copying by positioning the cursor 22 over at least a portion of the object WSProps.txt's icon 48 and placing the select switch of the cursor control device to the select position. The cursor 22, in its presently preferred form, has the visual appearance of a pointer. The user may further indicate that he wants to copy the object instead of moving the object by momentarily placing the "copy" key modifier on the keyboard (modified copy), otherwise the applications select one of the two operations by context (unmodified move or copy).

Figure 3B:
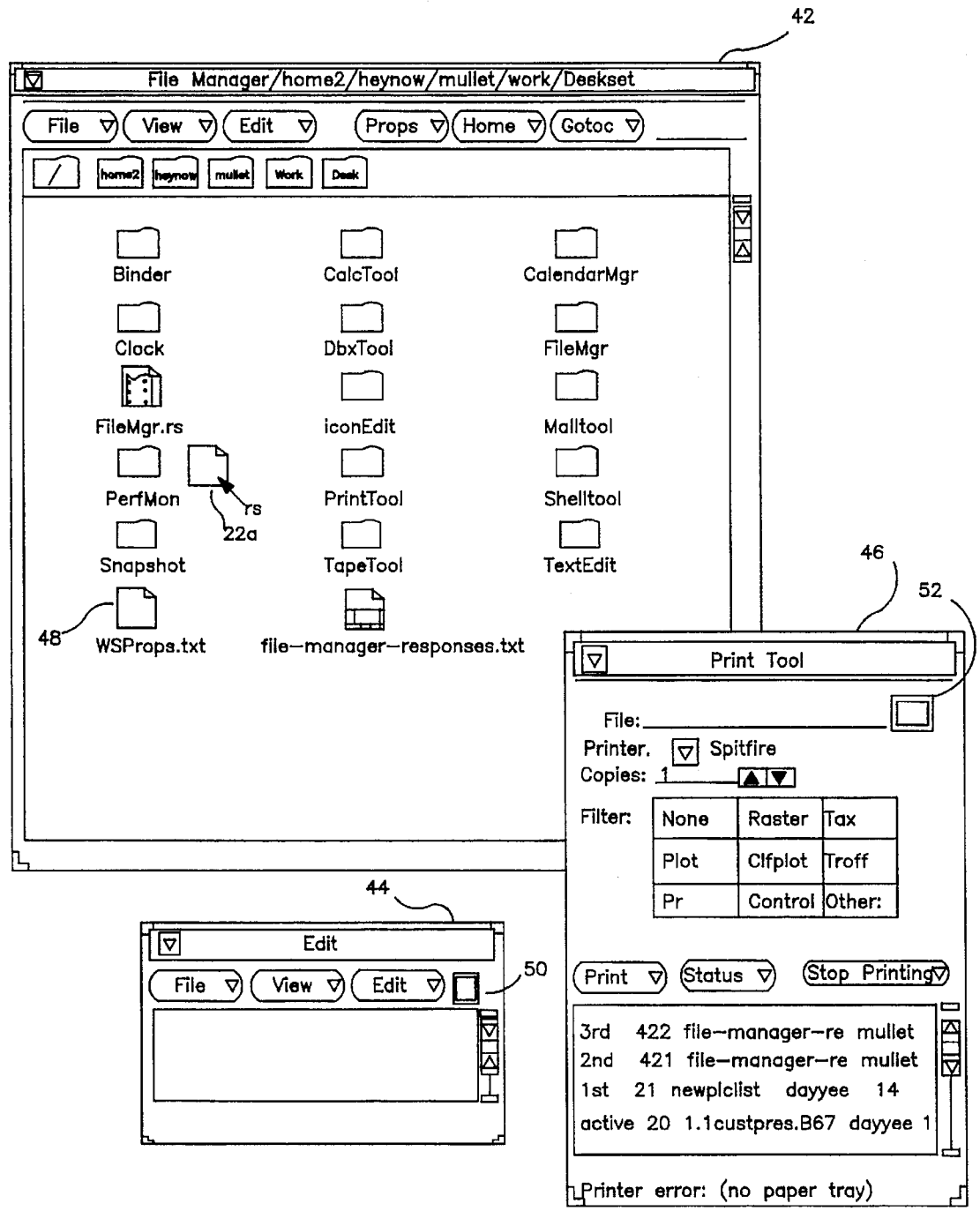

Referring now to FIG. 3b, the user moves/copies the object by repositioning the cursor 22a while holding down the select switch. The user releases the select switch when he has repositioned the cursor 22a over the destination bin image 50. After the user has repositioned the cursor for a pre-determined number of pixels (five in the presently preferred form), the cursor 22a is modified to provide visual feedback to the user. The cursor 22a is modified to identify that a copy operation is in progress. Furthermore, a duplicate image of the object icon is attached to the modified cursor 22a. (See also FIG. 6, ref. 66 for details.) This modified cursor 22a is repeatedly generated and displayed on the display 24 as the user repositions the modified cursor 22a over the destination of the copy operation. Thus, the repeatedly generated and displayed cursor 22a gives the user the perception that the object "WSProps.txt" is being relocated from its selected position to the destination.

Figure 3C:
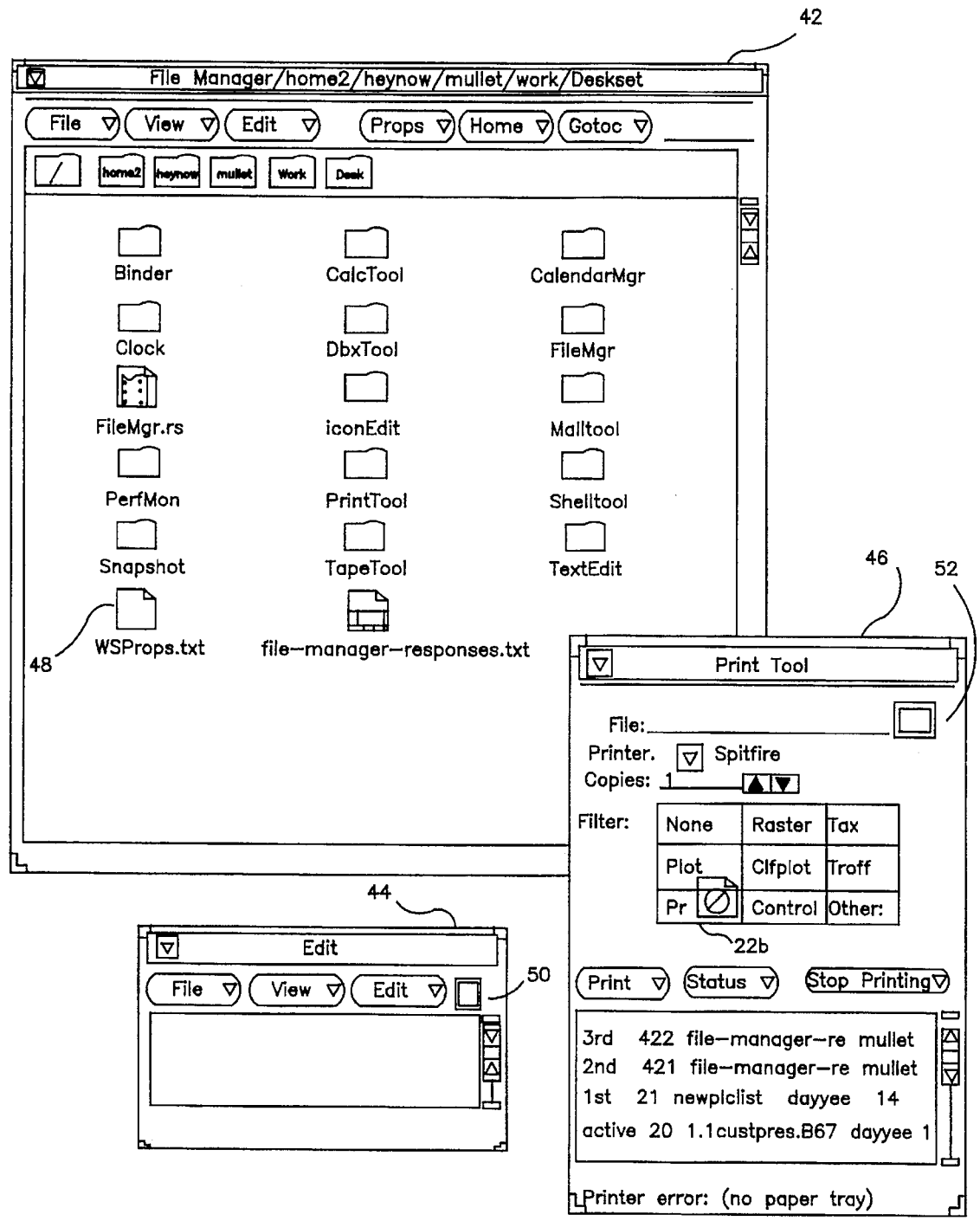
Figure 3D:
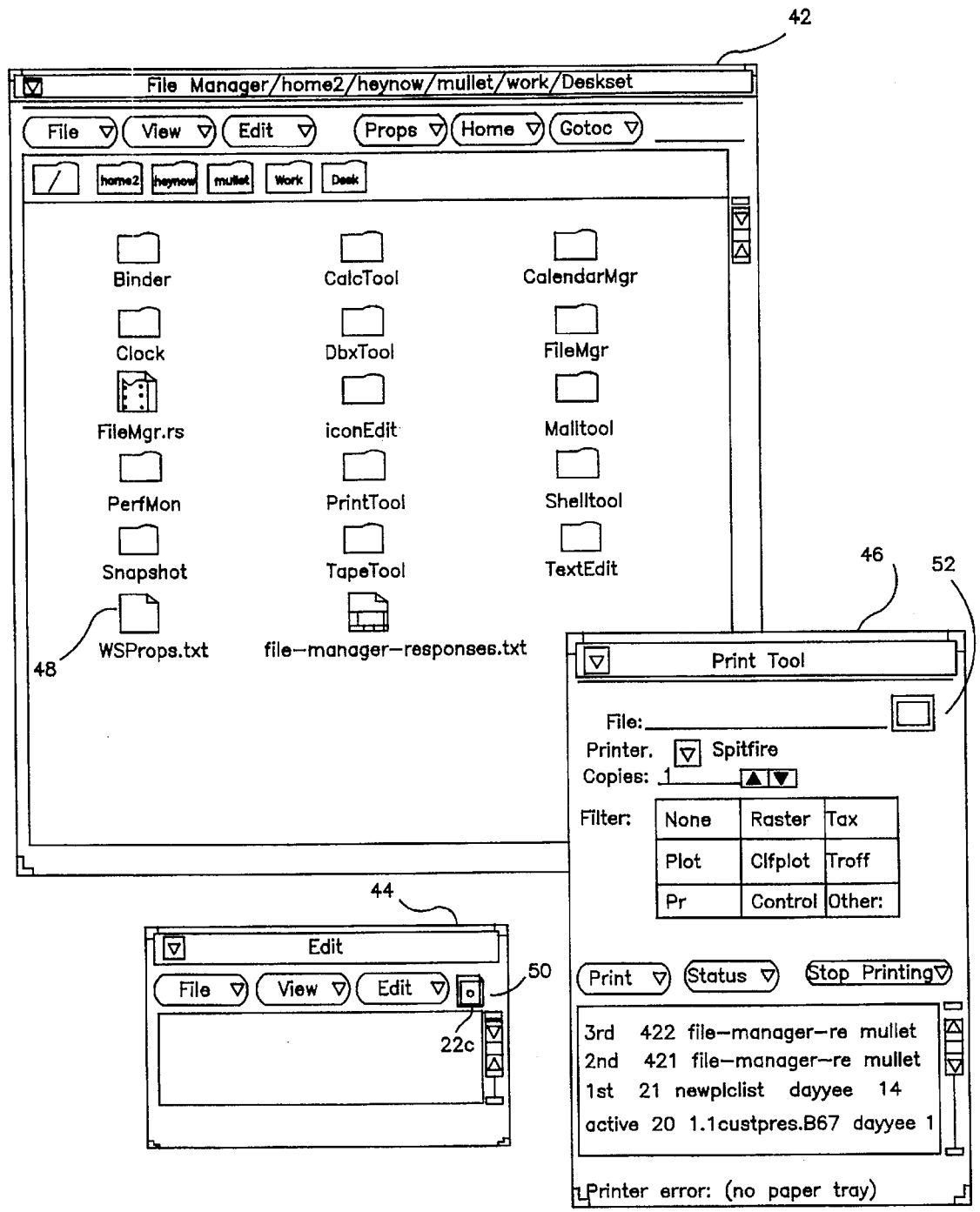

Referring now to FIGS. 3c and 3d, when the modified cursor 22a has been repositioned over a potential destination application, the preferred form of the present invention also provides the user with further feedback on the eligibility of the potential destination application and the specific destination to receive the object, before he releases the select switch. As shown in FIG. 3c, although the Print Tool application is eligible to receive the object, the specific destination where the cursor 22b is repositioned in the Print Tool window 46 is not eligible to receive the object, so the cursor 22b is further modified with a "Drop Not Allowed" symbol partially superimposed over it. The "Drop Not Allowed" symbol, in its presently preferred form, has the visual appearance of a "no entry" symbol. (See FIG. 6, ref. 78 for detail.) As shown in FIG. 3d, the Text Editor application as well as the specific destination where the cursor 22c is repositioned in the Text Editor display window 44, namely, the destination bin image 50, are eligible to receive the object, the cursor 22c is further modified with a "Drop Allowed" symbol partially superimposed over it. The "Drop Allowed" symbol, in its presently preferred form, has the visual appearance of an "on-target" symbol. (See also FIG. 6, ref. 90 for detail.)

Figure 3E:
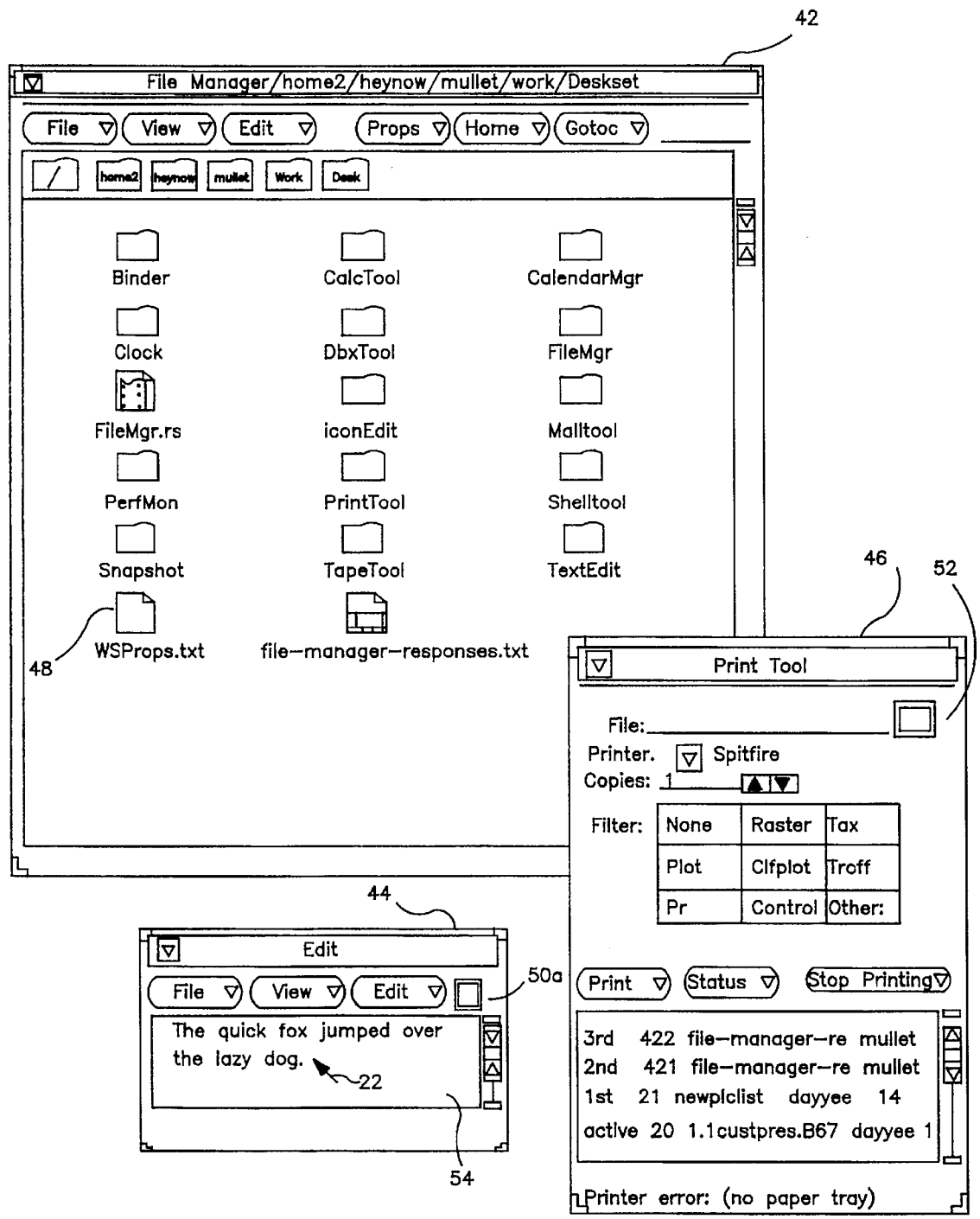
Figure 3F:
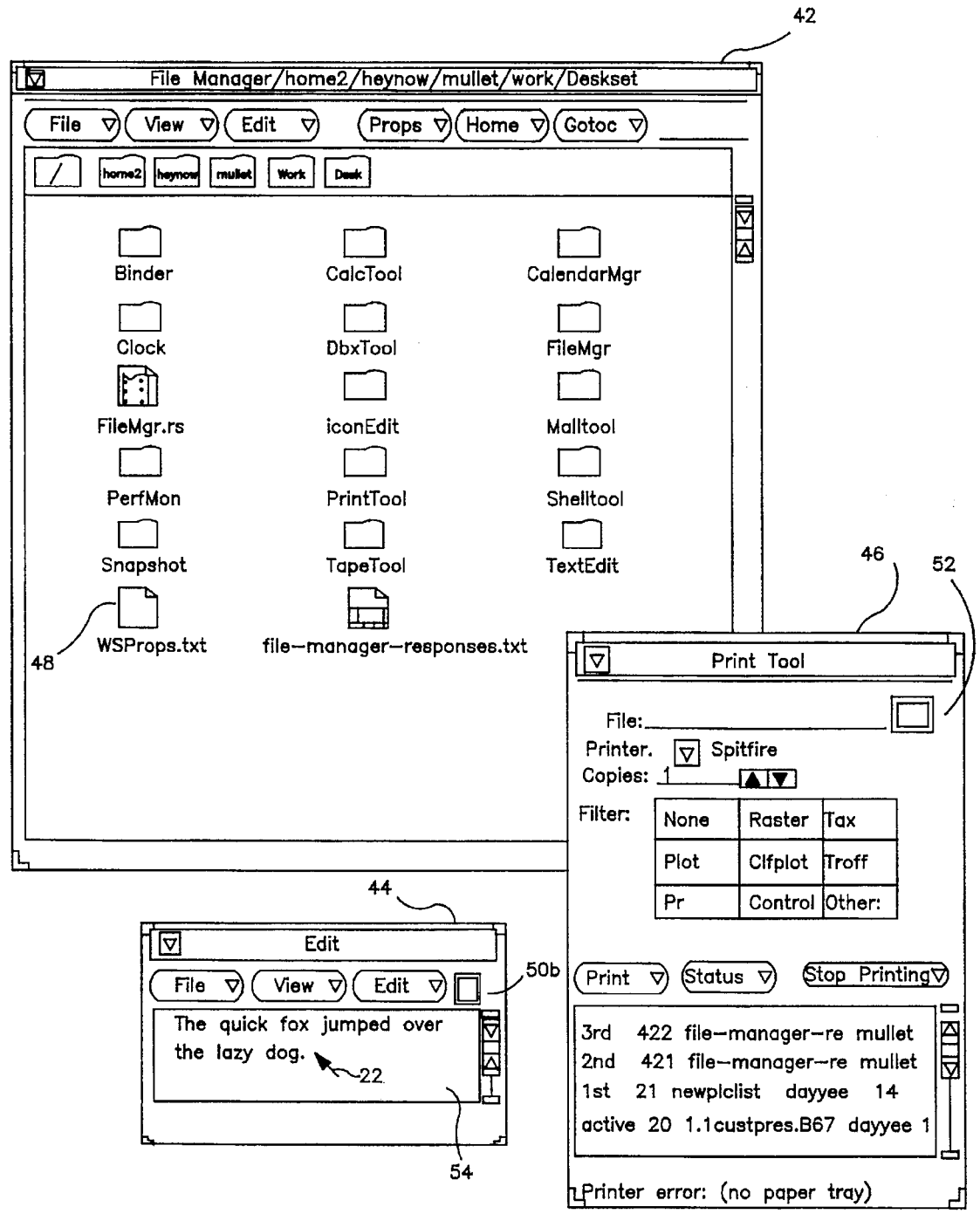

Referring now to FIGS. 3e and 3f, once the user releases the select switch after the modified cursor has been repositioned over the destination bin 50a, the object data is copied from the File Manager application to the Text Editor application. As shown in FIG. 3e, during this time, the destination bin image 50b in the Text Editor display window 44 is modified with a content image and a busy look to provide the user with feedback that the actual copy is in progress. (See also FIG. 6, ref. 100 for detail.) Additionally, the Text Editor display window 44 is repeatedly generated and displayed with the data pane 54 showing the content of the object "WSProps.txt" being copied into the Text Editor application.

As shown in FIG. 3f, at the end of the copying, the destination bin image 50b is again modified to provide the user with feedback on the completion of the data transfer. In addition, the destination bin image 50b is modified to indicate whether the object "WSProps.txt" may be further moved or copied from the Text Editor application to another application by "taking it out of the destination bin" or not. In other words, whether the "destination bin" 50b also serves as a "source bin". (See also FIG. 6, ref. 102 for detail.)

Continuing to refer to FIG. 3f, since the object "WSProps.txt" is copied from the File Manager application into the Text Editor application, so the File Manager display window 42 does not have to be regenerated and redisplayed by the CPU. If the object "WSProps.txt" is moved from the File Manager application into the Text Editor application instead, then the File Manager display window 42 is regenerated and redisplayed by the CPU without the object "WSProps.txt" icon 48.

While the first related mode of moving and copying an object of the present invention has been described with the exemplary copying of an object from the File Manager application to the Text Editor application, it will be appreciated that the first related mode of moving and copying of the present invention may copy an object, a collection of objects or a subset of an object, for example, a block of selected data, from one application to another as well as within an application. Different modified cursors are used to provide visual feedback if a collection of objects or a block of selected data is being moved or copied (See FIG. 6). The modified cursors used by the present invention will be discussed in further detail later.

This first related mode of moving and copying an object of the present invention that has just been described has at least one added advantage over the prior art. It offers the user an alternative quicker, simpler and more "obvious" way of replacing an object in the destination application. Under the prior art, it was not always clear which region of a display window, if any, permits a drop operation. If there is another object in the Text Editor application, and the cursor 22 is repositioned in the data pane 54 of the Text Editor display window, the object "WSProps.txt" is merged with the existing object at the point where the cursor 22 is repositioned. If the user wants to replace the existing object with the object "WSProps.txt", the user must first delete the existing object from the Editor application, or must drop on the Text Editor display window's window header.

Figure 4A:
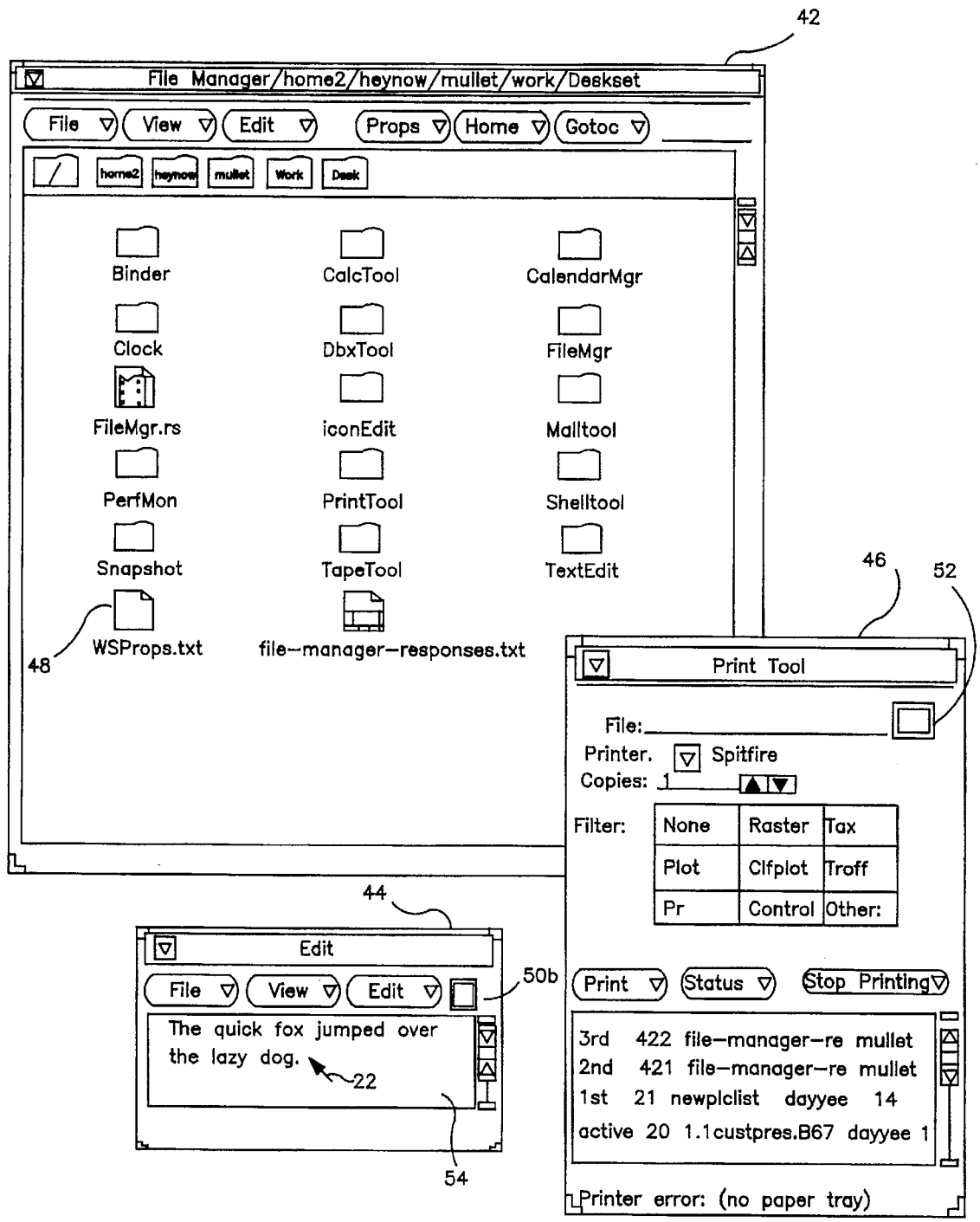
FIGS. 4a–4c graphically illustrate a second related mode of operation of the present invention in its preferred form.
Figure 4B:
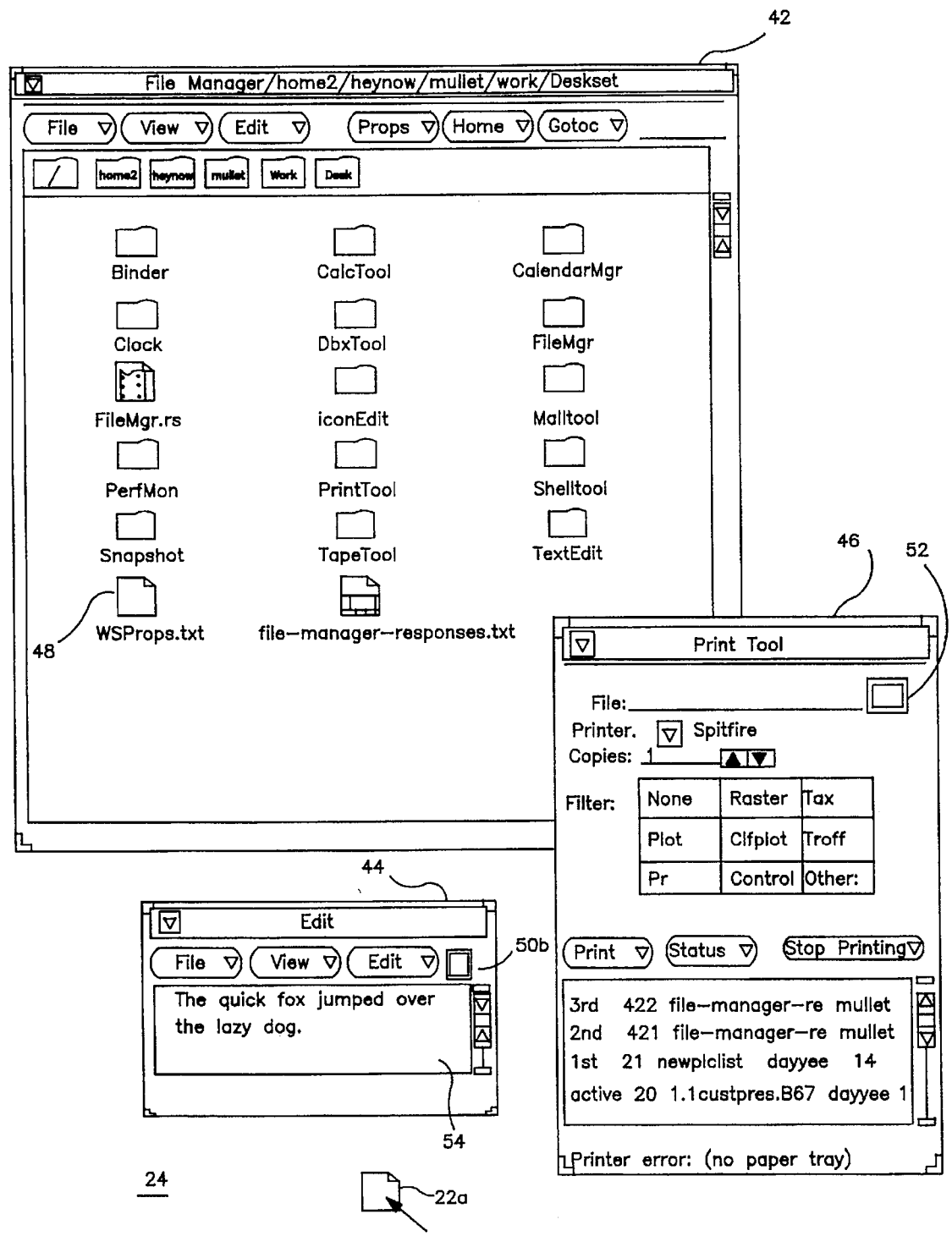
Figure 4C:
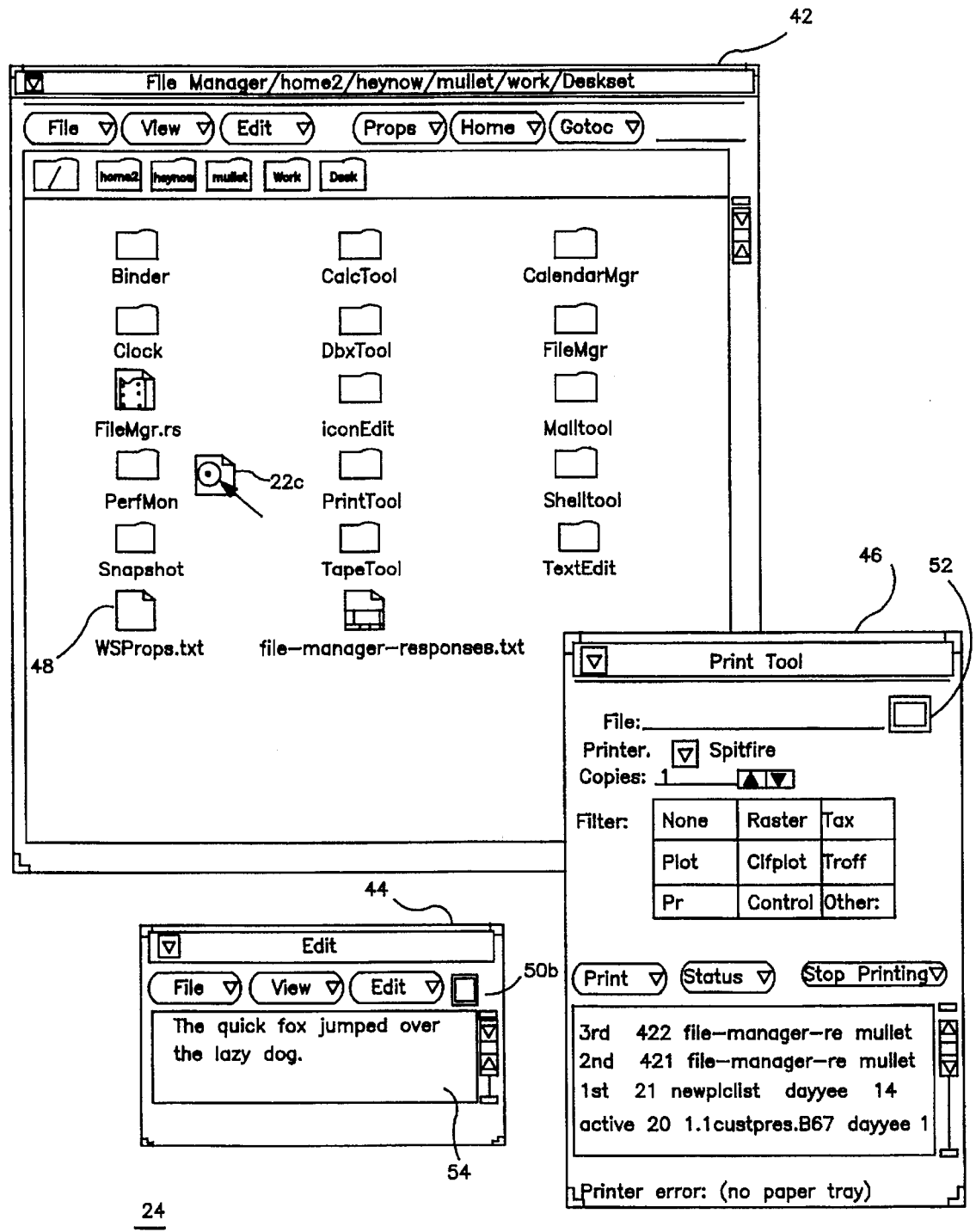

Referring now to FIGS. 4a–4c, a second related mode of operation of the present invention in its preferred form is illustrated. The second related mode of operation will be described by an exemplary unmodified copying of the object "WSProps.txt" from the Text Editor application back to the File Manager application, for example, after the user has made modifications to the object "WSProps.txt". As shown in FIG. 4a, the Text Editor display window 44 includes a source bin image 50b, and the object "WSProps.txt" in the data pane area 54, and the File Manager display window 42 contains the object "WSProps.txt" icon 48. Also shown is the Print Tool display window 48 including a destination bin image 52 and the File Manager display windows 42 containing a number of other objects.

Continuing to refer to FIG. 4a, similar to the first related mode of operation, the user selects the modified object "WSProps.txt" for copying by positioning the cursor 22 over at least a portion of the source bin image 50b and placing the select switch of the cursor control device to the select position. In this case, the user does not have to indicate the fact that he wants to copy the object by momentarily placing the "copy" key on the keyboard, the copy operation is always assumed (unmodified copy).

Referring now to FIG. 4b, similar to the first related mode of operation, the user copies the object by repositioning the cursor 22a while holding down the select switch. The user releases the select switch when he has repositioned the cursor 22a over the at least a portion of the File Manager display window 42. After the user has repositioned the cursor for a pre-determined number of pixels (five in the presently preferred form), the cursor 22a is modified to provide visual feedback to the user. The cursor 22a is modified to identify that a copy operation is in progress. Furthermore, a duplicate image of the object icon is attached to the modified cursor 22a. This modified cursor 22a is repeatedly generated and displayed on the display 24 as the user repositions the modified cursor 22a over the destination of the copy operation. Thus, the repeatedly generated and displayed cursor 22a gives the user the perception that the object "WSProps.txt" is being copied from the source bin to the destination in the File Manager display window 42.

Referring now to FIG. 4c, similar to the first related mode of operation, when the modified cursor 22c has been repositioned over at least a portion of the File Manager display window 42, the cursor 22c is modified with the "Drop Allowed" symbol partially superimposed over it to provide the user with feedback, that the File Manager application and the particular location of the File Manager display window 42 where the cursor 22c is positioned are eligible to accept the object. As discussed above, the visual feedback is provided immediately to the user before he releases the select switch. Likewise, had the user repositioned the cursor over an ineligible application or an ineligible location on the display window of an eligible application, the cursor is modified with a "Drop Not Allowed" symbol partially superimposed over it (not shown) to provide the user with visual feedback, that either the application or the location on the display window is not eligible to accept the object.

Continuing to refer to FIG. 4c, similar to the first related mode of operation, once the user releases the select switch after the modified cursor has been repositioned over at least a portion of the File Manager display window 42, the data object's contents are transferred from the Text Editor application to the File Manager application replacing the existing object in the File Manager application. It will be appreciated that the File Manager application may prompt the user asking the user to confirm indeed he wanted to replace the existing object "WSPreps.txt" in the File Manager application, for example, using a pop-up window (not shown) partially superimposing over the File Manager display window 42, before actually replacing the object "WSProps.txt". Additionally, in another context, a different application may elect to insert the data being copied into the current data instead. If the selected object is a block of selected data, the "Insert Drop Allowed" symbol is superimposed over the modified cursor instead of the "Drop Allowed" symbol. The "Insert Drop Allowed" symbol, in its presently preferred embodiment, has a visual appearance of the 'cross hair' symbol. (See FIG. 6, ref. 91, 93, 95 and 99 for detail.)

Since the object "WSProps.txt" is copied from the Text Editor application into the File Manager application, so the source bin image 50b in the Text Editor display window 44 does not have to be regenerated and redisplayed by the CPU. Likewise, since the object icon representing the object "WSProps.txt" is already displayed, the File Manager display window does not have to be regenerated and redisplayed. Under other context, the data pane of the destination display window may have to be regenerated and redisplayed.

This second related mode of copying an object of the present invention that has just been described has at least one added advantage over the prior art. It offers the user an alternative quicker, simpler, and more "obvious" approach to the "action bar" approach of the prior art for some object manipulation functions, for example, "save as" or multiple saves to different locations.

Figure 5A:
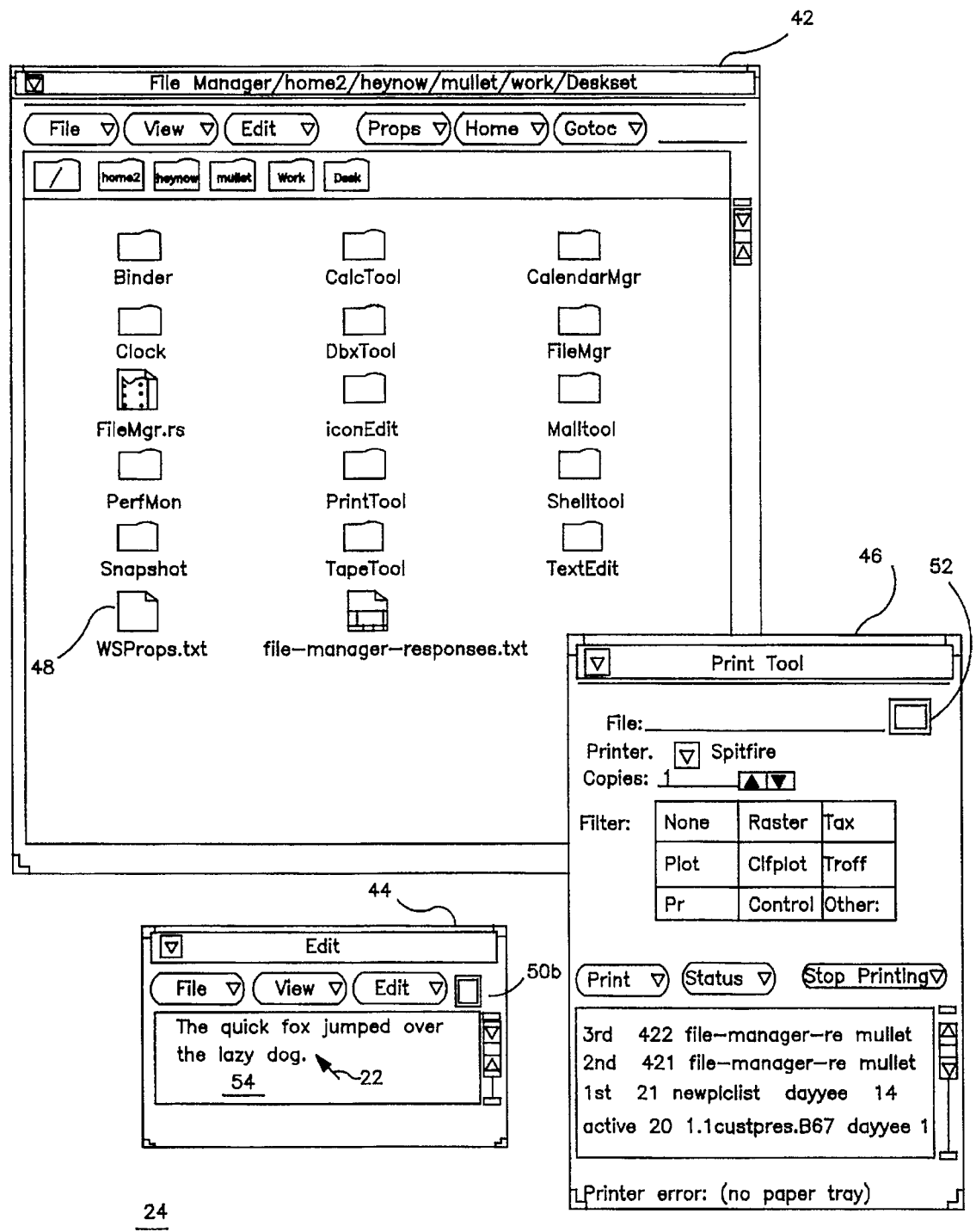
FIGS. 5a–5c graphically illustrate a third related mode of operation of the present invention in its preferred form.
Figure 5B:
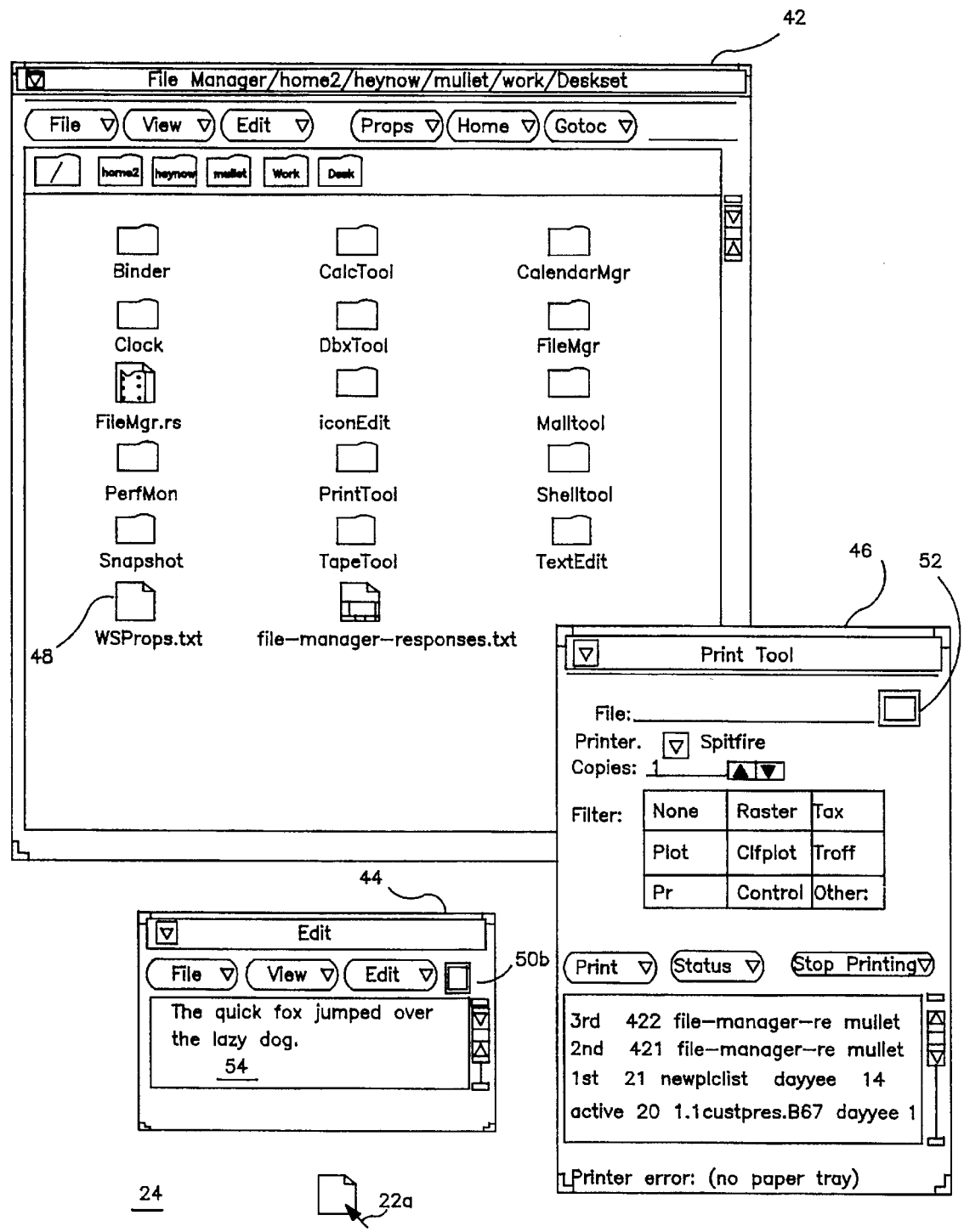
Figure 5C:
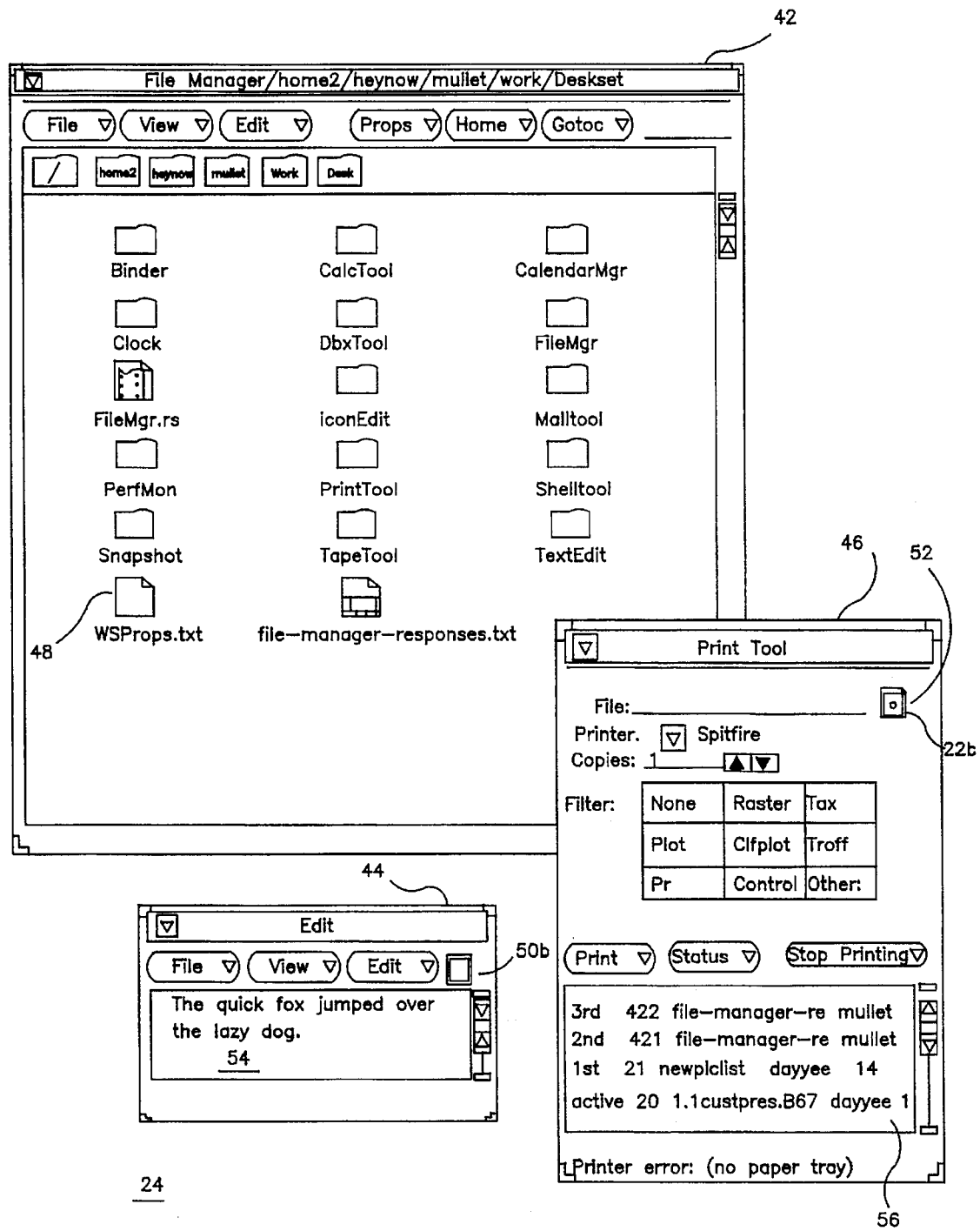

Referring now to FIGS. 5a–5c, a third related mode of operation of the present invention in its preferred form is illustrated. The third related mode of operation will be described by an exemplary unmodified copying of the object "WSProps.txt" from the Text Editor application to the Print Tool application, for example, after the user has made modifications to the object "WSProps.txt" and the user desires to have a hard copy of the modifications made. As shown in FIG. 5a, the Text Editor display window 44 includes the source bin image 50b, and contains the object "WSProps.txt" in its data pane 54, and the Print Tool display window 46 includes a destination bin image 52. Also shown is the File Manager display window 42 containing a number of objects.

Continuing to refer to FIG. 5a, similar to the first and second related modes of operation, the user selects the object "WSProps.txt" for copying by positioning the cursor 22 over at least a portion of the source bin image 50b and placing the select switch of the cursor control device to the select position. As described earlier in the second related mode of operation, the user does not have to indicate the fact that he wants to copy the object by momentarily placing the "copy" key on the keyboard, the copy operation is always assumed (unmodified copying).

Referring now to FIG. 5b, similar to the first and second modes of operation, the user copies the object by repositioning the cursor 22a while holding down the select switch. The user releases the select switch when he has repositioned the cursor 22a over the destination bin image 52 of the Print Tool display window 46. After the user has repositioned the cursor for a pre-determined number of pixels (five in the presently preferred form), the cursor 22a is modified to provide visual feedback to the user. The cursor 22a is modified to identify that a copy operation is in progress. Furthermore, a duplicate image of the object icon is attached to the modified cursor 22a. This modified cursor 22a is repeatedly generated and displayed on the display 24 as the user repositions the modified cursor 22a over the destination of the copy operation. Thus, the repeatedly generated and displayed cursor 22a gives the user the perception that the object "WSProps.txt" is being copied from the "source bin" to the "destination bin" in the Print Tool display window 46.

Referring now to FIG. 5c, similar to the first and second related modes of operation, when the modified cursor 22a has been repositioned over at least a portion of the destination bin image 52 of the Print Tool display window 46, the cursor 22c is modified with a "Drop Allowed" symbol partially superimposed over it to provide the user with feedback, that the Print Tool application and the "destination bin" 52 of the File Manager display window 42 where the cursor 22c is positioned are eligible to accept the object. As discussed above, the visual feedback is provided immediately to the user before he releases the select switch. Likewise, if the user repositions the cursor over an ineligible application or an ineligible location on the display window of an eligible application, the cursor is modified with a "Drop Not Allowed" symbol partially superimposed over it (not shown) to provide the user with visual feedback that either the application or the location on the display window is not eligible to accept the object.

Continuing to refer to FIG. 5c, similar to the first related mode of operation, once the user releases the select switch after the modified cursor has been repositioned over at least a portion of the destination bin image 52 in the Print Tool display window 46, the object "WSProps.txt" is copied from the Text Editor application to the Print Tool application. During this time, the destination bin image in the Print Tool display window 46 is modified with a busy look to provide the user with feedback that the actual copy is in progress (not shown). At the end of the copying, the destination bin image in the Print Tool display window 46 is again modified to provide the user with feedback on the completion of the data transfer (not shown). Likewise, the destination bin image in the Print Tool display window 46 is modified in a manner to inform the user whether the object "WSProps.txt" may not be further copied from the Print Tool application by "taking it out of the destination bin". That is, in this case, the "destination bin" does not serve as a "source bin".

Since the object "WSProps.txt" is copied from the Text Editor application into the Print Tool Application, so the Text Editor display window 44 including the source bin image 50b in the Text Editor display window 44 do not have to be regenerated and redisplayed by the CPU at the end of the copy. However, the data pane 56 of the Print Tool display window is regenerated and redisplayed by the CPU at the end of the copy, to reflect the object "WSProps.txt" is being queued for printing.

This third related mode of moving and copying object of the present invention that has just been described offers both of the added advantages over the prior art discussed above for the first and second related modes of operation.

Figure 6:
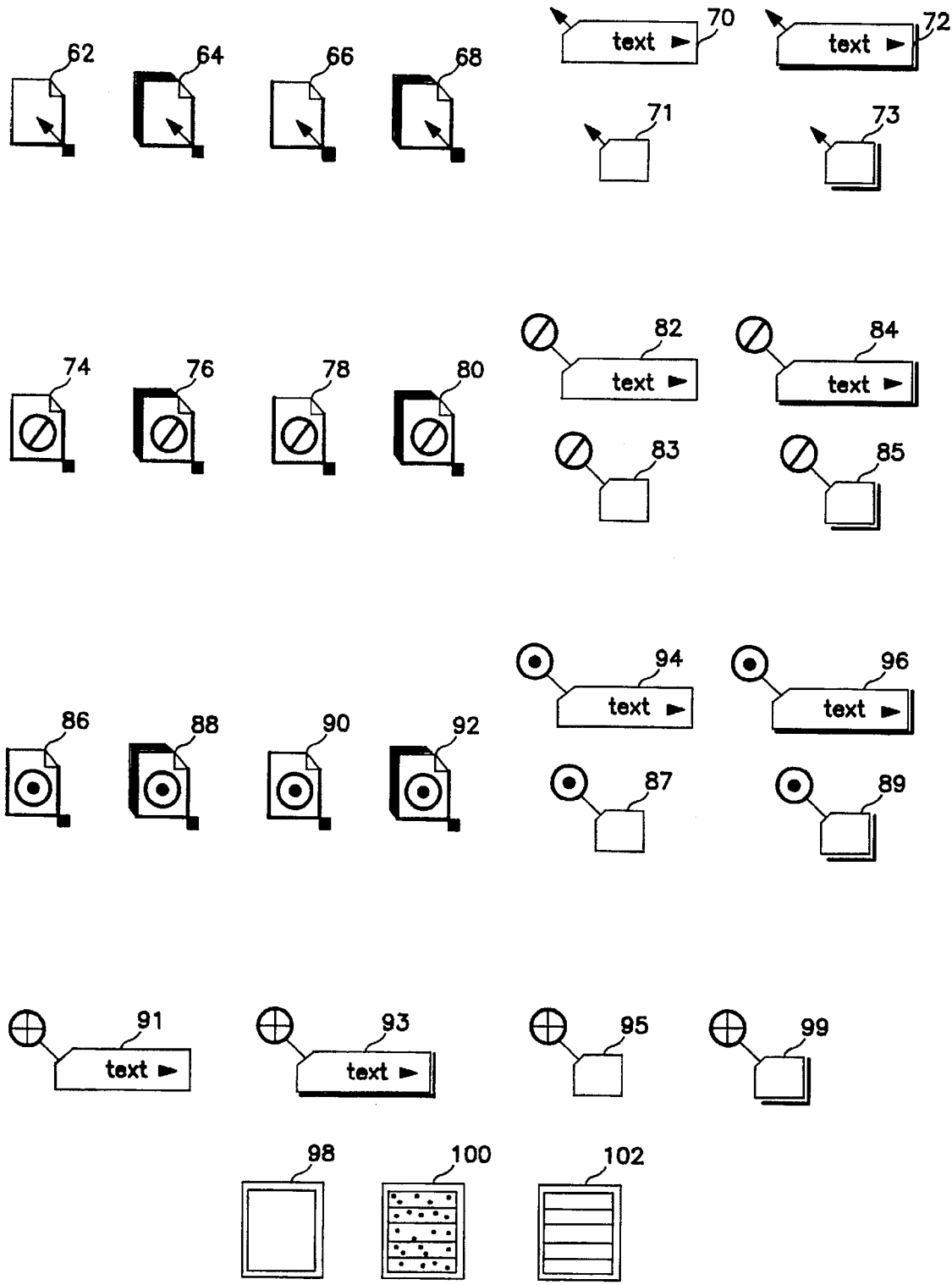
FIG. 6 shows the modified cursors and the source/destination bin icons used by the present invention in its preferred form.

Referring now to FIG. 6, the modified cursors and source/destination bin icons used by the present invention are shown. The modified cursors 62, 64, 70 and 71 denote that a data object, a collection of data objects, a block of selected text data, and a block of selected non-text data are being moved respectively. The modified cursors 66, 68 and 72 and 73 denote that a data object, a collection of data objects, a block of selected text data, and a block of selected non-text data are being copied respectively.

Similarly, the modified cursors 74, 76, 82 and 83 denote that a destination application or a destination in the destination application's display window is not eligible to accept the data object, the collection of data objects, the block of selected text data or the block of selected non-text data being moved respectively. The modified cursors 78, 80, 84 and 85 denote that a destination application or a destination in the destination application's display window is not eligible to accept the data object, the collection of data objects, the block of selected text data, or the block of selected non-text data are copied respectively.

Likewise, the modified cursors 86, 87, 88, 94, 91 and 95 denote that a destination application or a destination in the destination application's display window are eligible to accept the data object, the collection of data object, the block of selected text data or the block of selected non-text data being moved respectively. The modified cursors 90, 92, 96, 89, 93 and 99 denote that a destination application or a destination in the destination application's display window are eligible to accept the data object, the collection of data object, the block of selected text data, or the block of selected non-text data being copied respectively.

The destination bin image with an "empty" look 98 when displayed on an application's display window denotes that the application is eligible to accept an object through the "destination bin" represented by the destination bin image. The destination bin image with a "busy" look 100 when displayed on an application's display window denotes that an object is in the process of being moved or copied into the application. The destination bin image with the content image 102 when displayed on an application's display window denotes that the application is eligible to accept an object, and the object may be accepted through the "destination bin" represented by the "destination bin" image; furthermore, the application currently has an object and the object may be copied by "taking it out of the destination bin". In other words, the "destination bin" also serves as a "source bin".

Figure 7:
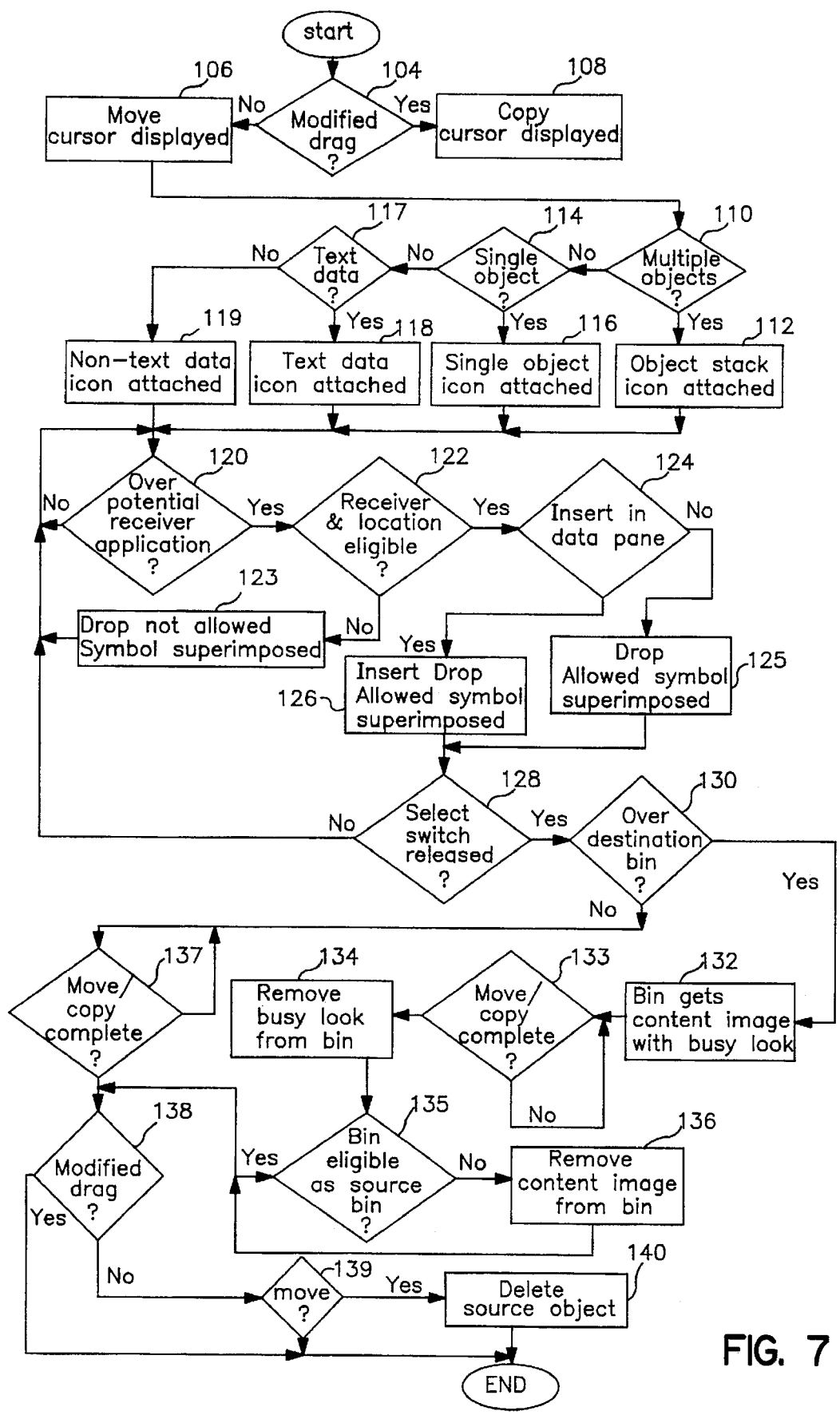
FIG. 7 is a summary flow chart illustrating the sequence of steps utilized by the present invention to move or copy an object from one application to another encompassing all three related modes of operation.

Referring now to FIG. 7, a summary flow chart for the operation of the present invention encompassing all three related modes of operation is shown. Initially, the present invention determines if the operation is a modified copy or an unmodified (move or copy) operation, block 104. If the operation is an unmodified (move or copy) operation, the move cursor is displayed, block 106, otherwise, the copy cursor is displayed, block 108. Then, the present invention determines whether multiple objects have been selected, block 110, that is a collection of data objects. If multiple objects have been selected, the object stack icon is displayed attached to the move/copy cursor, block 112, otherwise, the present invention further determines whether a single object has been selected, block 114. If a single object has been selected, the single object icon is displayed attached to the move/copy cursor, block 116, otherwise, the present invention further determines whether the block of selected data are text data or non-text data, block 117. If text data are selected, an icon representing the block of selected text data is displayed attached to the move/copy cursor, block 118, otherwise an icon representing the block of selected non-text data is displayed attached to the move/copy cursor, block 119.

As the user repositions the modified cursor, the present invention monitors the modified cursors current location and determines if the modified cursor is at least partially over a potential receiver application, block 120. If a potential receiver application is detected, the present invention further determines if the potential receiver application and the modified cursor's current location are eligible to accept the object, block 122. If either the application or the modified cursors current location are not eligible to accept the object, the "Drop Not Allowed" is superimposed over the modified cursor, block 123, otherwise, the present invention further determines if the data are to be inserted into the current data in a data pane, block 124. If the data are not being inserted into the current data, the "Drop Allowed" symbol is superimposed over the modified cursor, block 125, otherwise, the "Insert Drop Allowed" symbol is superimposed over the modified cursor, block 126.

For eligible applications and locations, the present invention further determines whether the user releases the select switch, block 128. If the user releases the select switch, the present invention further determines if the select switch is released over a destination bin image, block 130. If the user releases the select switch over a destination bin image, the "destination bin" image is modified with a context image having a busy look, block 132. Furthermore, at the end of copying or moving, the present invention removes the busy look from the destination bin image, block 134, determines if the object may be further copied by "taking the object out of the destination bin", block 135. If the object may not be further copied by "taking it out of the destination bin", the destination bin image is modified with the content image removed denoting the "the destination bin" does not also serve as a "source bin", block 136.

For an unmodified operation (move or copy), the present invention further determines if the operation is a move or copy operation, block 139. If the unmodified operation is a move operation, the present invention deletes the object from the source application and refreshes the source application's display window, block 140.

While the present invention has been described in terms of three exemplary copying operations with three applications, those skilled in the art will recognize that the invention is not limited to the exemplary copying operations and the applications described. In particular, the second and third related modes of operation do not have to be limited to the copying operation. The move operation may be supported in a similar manner as the first mode of operation. The apparatus and method of the present invention can be practiced with modification and alteration within the spirit and scope of the appended claims to serve a variety of moving and copying operations among a variety of applications.

What is claimed is:

1. In a computer system comprising a display coupled to a central processing unit (CPU) executing a first and second applications on behalf of a user, a method for executing a copy operation of objects between said first and second applications by said user, comprising the steps of:

a) generating and displaying a first and second display windows on said display for said first and second applications by said CPU, said first and second display windows comprising a source and destination bin images respectively, said source bin image containing a content image denoting said first application having an object, said source and destination bin images on said display being at least partially visible to said user;

b) positioning a cursor over at least a portion of said source bin image on said display by said user, using a cursor control device coupled to said CPU;

c) providing a select signal to said CPU to denote the selection of said object by said user, said select signal being generated by placing a select switch coupled to said CPU in a select position;

d) positioning said cursor over a portion of said destination bin image, said select switch being maintained in said select position until said cursor is positioned over said portion of said destination bin image by said user;

e) placing said select switch in a unselect position once said cursor has been positioned over said portion of said destination bin image by said user; and f) copying by said CPU of said object to said second application.

2. The method as set forth in claim 1 wherein said object is a group of selected data; said group of selected data being displayed in said first display window, said data being one of text and non-text data.

3. The method as set forth in claim 1 wherein said object is a data object; said data object being displayed in said first display window.

4. The method as set forth in claim 1 wherein said source bin image is in a form of a substantially rectangular filled open box with a sunken look, said source bin image further comprised of a content image.

5. The method as set forth in claim 1 wherein said destination bin image is in a form of a substantially rectangular open box with a sunken look, said destination bin image further comprises one of an empty and a content images.

6. The method as set forth in claim 1 wherein said select switch is disposed on said cursor control device.

7. The method as set forth in claim 1 wherein said cursor is in a form of a pointer.

8. The method as set forth in claim 1 wherein said method further comprises the step of repeatedly generating and displaying said cursor on said display modified after said cursor has moved over a pre-determined number of pixels of said display signifying the beginning of said copy operation, and while said cursor is being repositioned from one of said object's selected position and said source bin image in said first display window to one of said portion of said destination bin image and said second display window, thereby giving said user a perception that said object is being copied from said first application to said second application.

9. The method as set forth in claim 8 wherein said modified cursor is in a form of a copy pointer having an object icon attached to it.

10. The method as set forth in claim 9 wherein, if said object is a group of selected data, said object icon is one of a first and second substantially rectangular boxes identifying the selected data as one of text and non-text data;

if said object is a data object, said object icon is a data object icon; and if said object is a data object container, said object icon is a data object container icon.

11. The method as set forth in claim 1 wherein said method further comprises the step of regenerating and redisplaying said cursor on said display modified denoting whether said second application is eligible to accept said object, immediately after said cursor is repositioned over one of said portion of said destination bin image and said second display window and before said select switch is placed into said unselect position.

12. The method as set forth in claim 11 wherein, if said second application is eligible to receive said object, said modified cursor is in a form of a copy pointer having an object icon attached to it and one of an on target and cross hair images superimposed on said attached object icon; and if said second application is not eligible to receive said object, said modified cursor is in a form of a copy pointer having an object icon attached to it and a no entry image superimposed on said attached object icon.

13. The method as set forth in claim 1 wherein said method further comprises the step of repeatedly generating and displaying said destination bin image to give said user a perception that said object is being copied into said second application, after said cursor has been repositioned over said portion of said destination bin image, said select switch has been placed in said unselect position, and while said object is being copied from said first application to said second application by said CPU.

14. The method as set forth in claim 13 wherein said modified destination bin image is in a form of a substantially rectangular filled open box with a content and busy look.

15. The method as set forth in claim 1 wherein said method further comprises the step of regenerating and redisplaying said second display window to reflect said object having been copied from said first application to said second application after said object has been copied from said first application to said second application by said CPU, said second display window being regenerated and redisplayed with said object and said destination bin image modified.

16. The method as set forth in claim 15 wherein said modified destination bin image is in a form of a substantially rectangular filled open box with one of an empty and a content images.

17. The method as set forth in claim 1 wherein said object being copied from said first application replaces a current object in said second application.

18. The method as set forth in claim 1 wherein said first and second applications are the same application, said object being copied from a first part to a second part of said same application.

19. A computer controlled display system comprising a display coupled to a central processing unit (CPU) executing a first and second applications on behalf of a user, said display system comprising:

a) display generation means coupled to said CPU for generating and displaying a first and second display windows on said display for said first and second applications, said first and second display windows comprising a source and destination bin images, said source bin image containing a content image denoting said first application having an object, said source and destination bin images on said display being at least partially visible to said user;

b) cursor control means coupled to said CPU for selectively positioning a cursor on said display; and c) select signal generation means coupled to said CPU comprising a select switch having a select and unselect position for providing a select signal to said CPU to denote the selection of said object, said select signal being generated by placing said select switch in said select position, said select signal being generated and provided to said CPU until said select switch is placed in said unselect position;

said select switch being placed in said select position by said user once said cursor has been positioned by said user over at least a portion of said source bin image on said display, said select switch being maintained in said select position by said user until said cursor is repositioned over at least a portion of said destination bin image on said display, said select switch being returned to said unselect position by said user once said cursor has been repositioned over said portion of said destination bin image on said display;

whereby causing said object to be copied from said first application to said second application by said CPU.

20. The computer controlled display system as set forth in claim 19 wherein said object is a group of selected data; said group of selected data being displayed in said first display window; said data being on of text and non-text data.

21. The computer controlled display system as set forth in claim 19 wherein said object is a data object; said data object being displayed in said first display window.

22. The method as set forth in claim 19 wherein said source bin image is in a form of a substantially rectangular filled open box with a sunken look, said source bin image further comprised of a content image.

23. The computer controlled display system as set forth in claims 19 wherein said destination bin image is in a form of a substantially rectangular open box with a sunken look, said destination bin image further comprises one of an empty and a content images.

24. The computer controlled display system as set forth in claim 19 wherein said cursor control means is a cursor control device comprises said select signal generating means, and said select switch is disposed on said cursor control device.

25. The computer controlled display system as set forth in claim 19 wherein said cursor is in a form of a pointer.

26. The computer controlled display system as set forth in claim 19 wherein said CPU repeatedly generating and displaying said cursor on said display modified after said cursor has moved over a pre-determined number of pixels of said display signifying the beginning of one of said move and copy, and while said cursor is being repositioned from one of said object's selected position and said source bin image in said first display window to one of said portion of said destination bin image and said second display window, thereby giving said user a perception that said object is being moved/copied from said first application to said second application.

27. The computer controlled display system as set forth in claim 26 wherein said modified cursor is in a form of a copy pointer having an object icon attached to it.

28. The computer controlled display system as set forth in claim 27 wherein, if said object is a group of selected data, said object icon is one of a first and second substantially rectangular boxes identifying the selected data as one of text and non-text data;

if said object is a data object, said object icon is a data object icon; and if said object is a data object container, said object icon is a data object container icon.

29. The computer controlled display system as set forth in claim 19 wherein said CPU regenerates and redisplays said cursor on said display modified denoting whether said second application is eligible to accept said object, immediately after said cursor is repositioned over one of said portion of said destination bin image and said second display window and before said select switch is placed into said unselect position.

30. The computer controlled display system as set forth in claim 29 wherein, if said second application is eligible to receive said object, said modified cursor is in a form of a copy pointer having an object icon attached to it and one of an on target and cross hair images superimposed on said attached object icon; and if said second application is not eligible to receive said object, said modified cursor is in a form of a copy pointer having an object icon attached to it and one of a no entry image superimposed on said attached object icon.

31. The computer controlled display system as set forth in claim 19 wherein said CPU repeatedly generating and displaying said destination bin image modified to give said user a perception that said object is being copied into said second application, after said cursor has been repositioned over said portion of said destination bin image, said select switch has been placed in said unselect position, and while said object is being copied from said first application to said second application by said CPU.

32. The computer controlled display system as set forth in claim 31 wherein said modified destination bin image is in a form of a substantially rectangular filled open box with a content and busy look.

33. The computer controlled display system as set forth in claim 19 wherein said CPU regenerates and redisplays said second display window to reflect said object having been copied from said first application to said second application after said object has been copied from said first application to said second application by said CPU, said second display window being regenerated and redisplayed with said object and said destination bin image modified.

34. The computer controlled display system as set forth in claim 33 wherein said modified destination bin image is in a form of a substantially rectangular filled open box with one of an empty and a content image.

35. The computer controlled display system as set forth in claim 19 wherein said object being copied from said first application replaces a current object in said second application.

36. The computer controlled display system as set forth in claim 19 wherein said first and second applications are the same application; said object being copied from a first part to a second part of said same application.

37. An improved computer system including a user interface, said user interface comprising a first window of a first application having a source bin image and a second window of a second application having a destination bin image, said source bin image denoting said first application as a data source for a data copying operation, said destination bin image having an empty box look, a busy look and a content image look denoting said second application as an eligible recipient application of said copy data.

38. The improved computer system of claim 37, wherein said user interface further comprises a cursor having a first cursor image for normal display, a second cursor image for denoting an application as an ineligible recipient application of copy data, and a third cursor image for denoting an application as an eligible recipient application of copy data.

39. An improved computer system including a user interface, said user interface comprising:

a cursor having a first cursor image for normal display, a second cursor image for denoting an application as an ineligible recipient application of copy data, and a third cursor image for denoting an application as an eligible recipient application of said copy data;

a first window of a first application having a source bin image, said source bin image denoting said first application as a data source for a data copying operation; and a second window of a second application having a destination bin image, said destination bin image having an empty box look, a busy look and a content image look denoting said second application as an eligible recipient application of said copy data.

* * * * *

UNITED STATES PATENT AND TRADEMARK OFFICE
CERTIFICATE OF CORRECTION

PATENT NO. : 5,638,505
DATED : June 10, 1997
INVENTOR(S) : Hemenway et al.

It is certified that error appears in the above-indentified patent and that said Letters Patent is hereby corrected as shown below:

In column 16, claim 26 at lines 10-11, please delete " of one of said move and copy" and insert -- of said copy --.

In column 16, claim 26 at line 16, please delete " moved/ ".

Signed and Sealed this

Twenty-first Day of October 1997

Attest:

BRUCE LEHMAN

Attesting Officer

Commissioner of Patents and Trademarks